April 16, 1940.  G. M. GRAHAM ET AL  2,197,468
WHEEL MEASURING DEVICE
Filed May 25, 1935    3 Sheets-Sheet 1
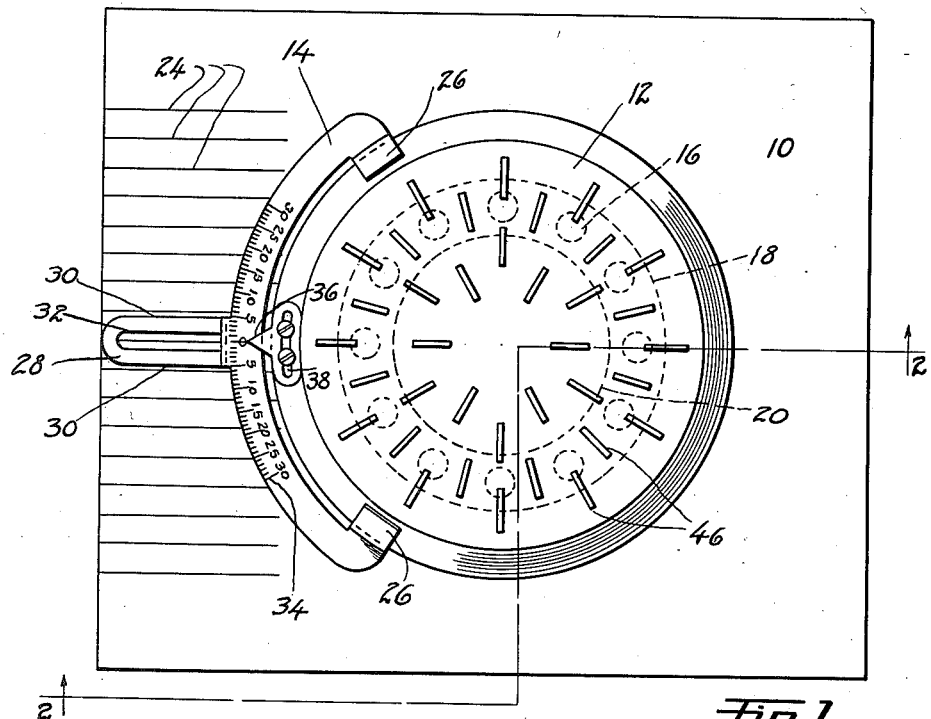
Fig.1
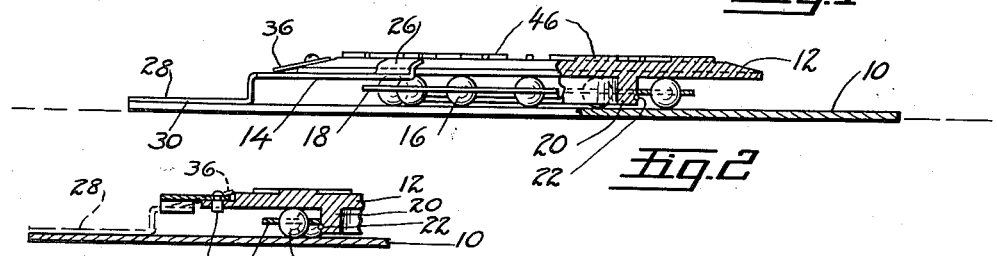
Fig.2
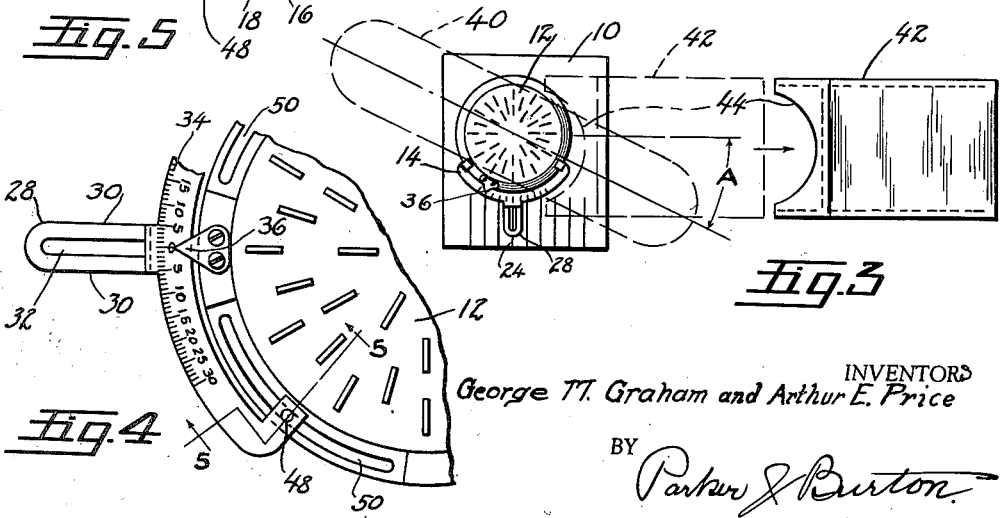
Fig.5
Fig.3
Fig.4
INVENTORS
George M. Graham and Arthur E. Price
BY
Parker & Burton
ATTORNEYS

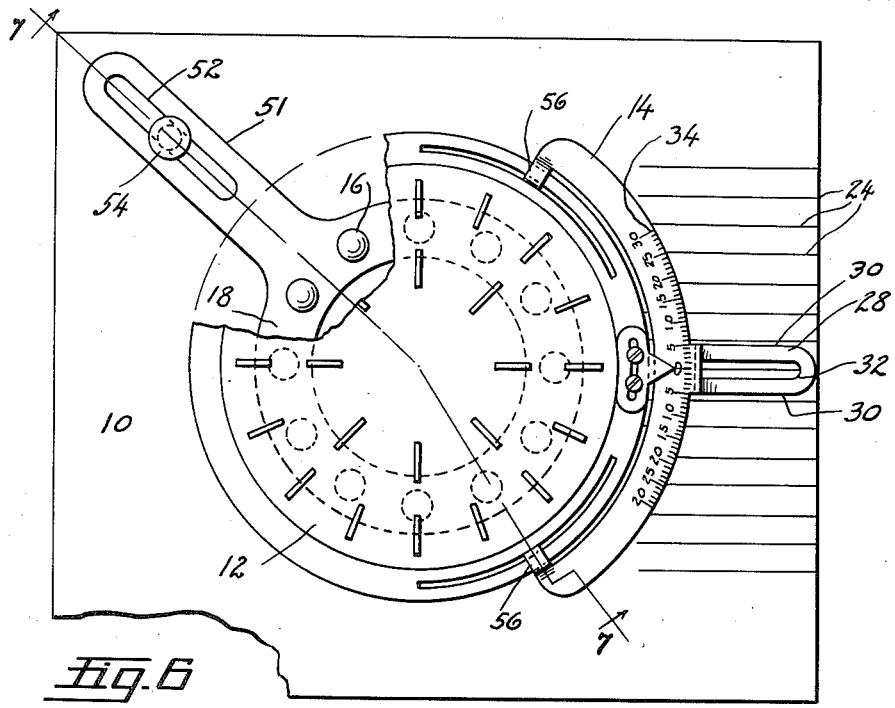
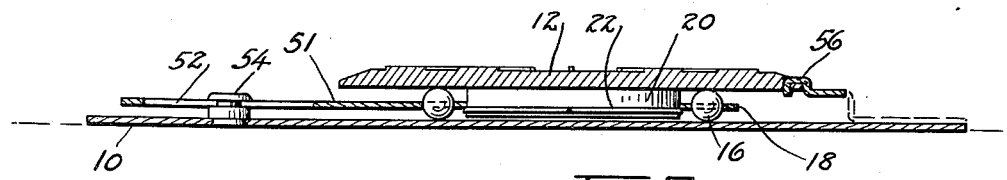
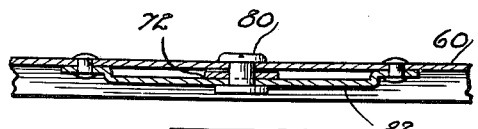
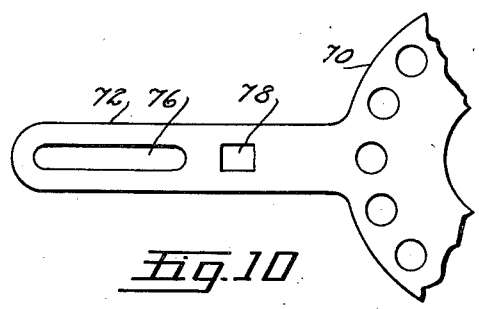
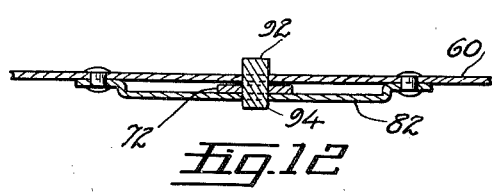

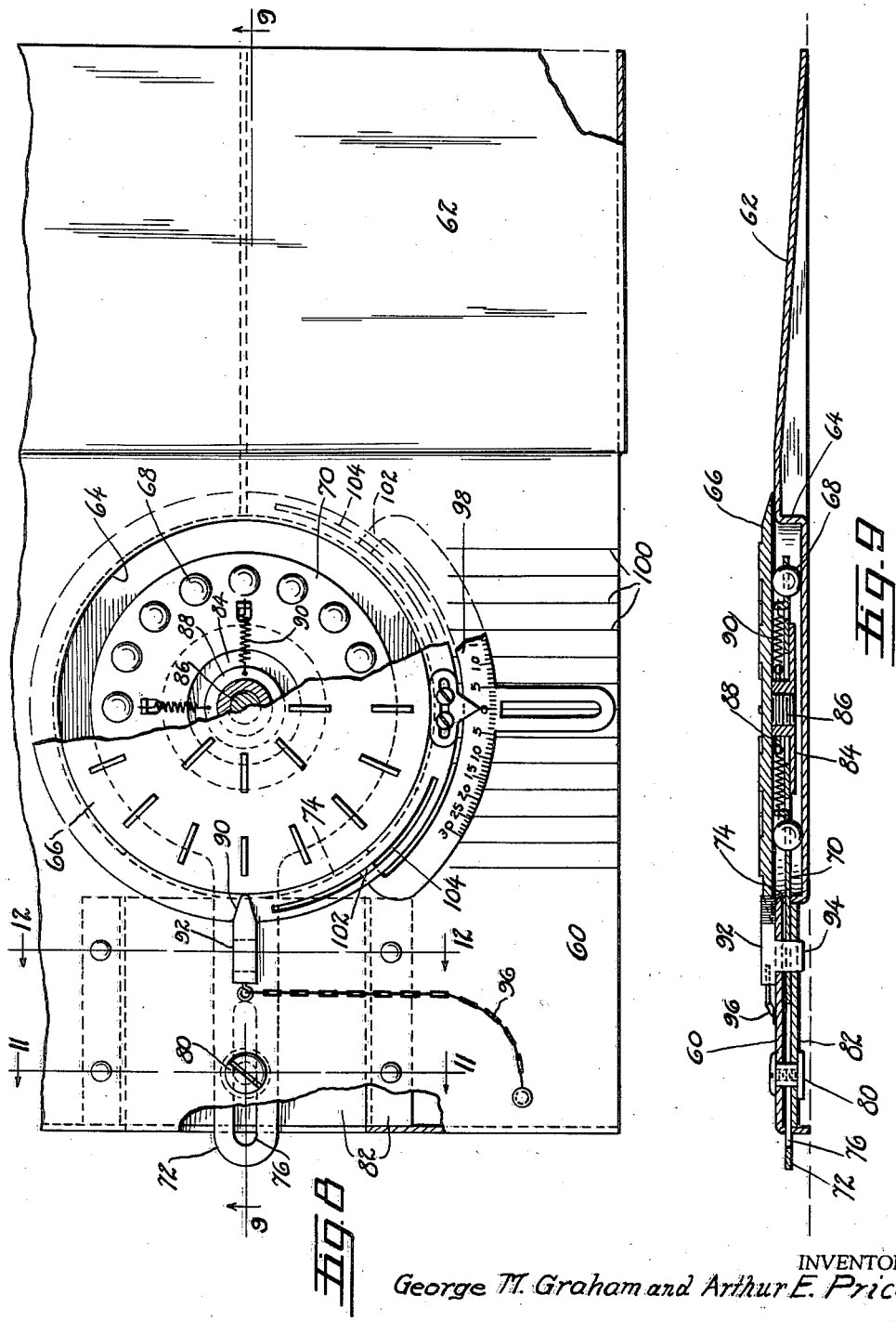

Patented Apr. 16, 1940

2,197,468

UNITED STATES PATENT OFFICE 2,197,468

WHEEL MEASURING DEVICE

George M. Graham, Detroit, and Arthur E. Price, Jackson, Mich., assignors to Hinckley-Myers Company, Jackson, Mich., a corporation of Michigan Application May 25, 1935, Serial No. 23,366

16 Claims. (Cl. 33—203)

This invention relates to a device for measuring the angles through which the steering wheels of vehicles may turn, and particularly to such a device having an improved arrangement of parts to compensate for the lateral shifting or displacement of the wheels during the turning of the same.

When alignment tests are applied to the front steering wheels of vehicles, it is necessary to turn the wheels from side to side through prescribed angles. The geometric arrangement of the parts of each steering wheel is such that the contact point of the wheel partakes of a lateral or planetary movement when the wheel is turning about its steering axis. This is caused by the peculiarities of pneumatic tires and the failure of the caster, camber and king pin inclination to coincide at the point of contact of the wheel to the ground. Some arrangement must be made for compensating for this lateral displacement without affecting the measurement of the turning angle, or exact measurements cannot be made.

It is an important object of this invention to provide an improved device for measuring with accuracy and precision the turning radius of steering wheels irrespective of the lateral or planetary shifting of the same. A meritorious feature of the device resides in the relatively few and inexpensive parts composing the device, and the ease with which the device may be assembled and dismantled. Another feature of importance resides in the novel manner of measuring the turning angle of the wheel with respect to a fixed reference point irrespective of lateral displacement of the wheel relative to this reference point.

Three illustrative embodiments of the invention are shown and described hereinafter. The essential features of these embodiments are a base, a wheel carrying element free to rotate and slide over the base, and an angle measuring instrument or protractor capable of measuring the rotation of the wheel carrying element relative to the base irrespective of the lateral displacement of the same upon the base. To accomplish the measurement of the angle through which the wheel carrying element rotates about its axis regardless of its lateral displacement, a novel association of the protractor with the wheel carrying element and the base is provided. A plurality of reference indications are formed on the base and the protractor is capable of registering with any one or more of these reference indications as it follows the lateral displacement of the element in its slidable movement. Irrespective of where the element is moved over the surface of the base, the rotation of the element is capable of measurement by the protractor.

In one of these embodiments there are three elements, each independently removable from one another. In another embodiment the three essential parts are coupled together into a unitary structure while at the same time permitting free play of the parts in the manner as if they were independent of one another. In the third embodiment, the base is provided with a depressed portion and a ramp or runway upon which the wheel to be measured may be conducted. A wheel carrying member is supported above the depressed portion for rotatable and floatable movement and a protractor is capable of cooperating with certain references on the base for measuring the rotation of the member regardless of where it may float. An additional feature of this embodiment is the provision of means for locking the wheel carrying member in centered position while the wheel is run thereupon.

Various other objects and meritorious features of the invention reside in the simplicity of arrangement and of the parts utilized whereby the expense of manufacture and assembly is substantially reduced while at the same time providing a compact, readily dismantable, construction.

Reference is now made to the drawings wherein:

Figure 1 is a top plan view of the radius turning gauge,

Figure 2 is a side view, partly in cross section, showing the manner of assembly, Figure 3 is a top plan view indicating the manner of turning a wheel to measure its turning radius and the manner of conducting a wheel to and from the device.

Figure 4 is a detailed view showing a modified arrangement for adjustably securing the protractor for adjustable movement about the edge of the wheel carrying element.

Figure 5 is a section taken on line 5—5 of Fig. 4.

Figure 6 is a top view, partly broken away, of a modified form of the invention in which the parts are coupled into a unitary structure.

Figure 7 is a cross section along line 7—7 of Fig. 6.

Fig. 8 is a top view, partly broken away, of a modification of the invention in which the base also provides a ramp for conducting wheels to the top thereof.

Fig. 9 is a cross sectional view along line 9—9 of Fig. 8.

Fig. 10 is a detail view of the bearing cage showing the provision for permitting lateral movement thereof.

Fig. 11 is a cross sectional view along line 11—11 of Fig. 8.

Fig. 12 is a cross sectional view along line 12—12 of Fig. 8.

The invention is comprised essentially of three parts; a base plate 10, a wheel carrying member or disc 12 and a dial or protractor 14. As indicated in Figure 2, the disc is rotatably and slidably supported on the surface of the base plate by ball thrust bearings 16 rotatably secured within an annular cage 18. This cage fits about an annular flange 20 depending from the disc and is bodily shiftable therewith. A split or snap ring 22 may be positioned around the depending flange 20 below the bearing cage for the purpose of securing the cage to the disc for removal as a unit.

A plurality of parallel reference lines 24 are etched or otherwise formed on the surface of the base plate preferable along one edge. When the device is in use, the parallel guide or reference lines bear a predetermined relationship to the longitudinal axis of the vehicle, preferably at right angles thereto.

The arcuate protractor 14 has an internal radius corresponding to the edge of the disc 12. The two opposite ends 26 of the protractor are elevated and turned inwardly so as to rest upon the sloping margin of the disc. Extending rearwardly from the center of the protractor is an arm or tongue 28 bent downward to rest on the base plate and having parallel side edges 30 and a central slot 32. As indicated in Figure 1 this arm is capable of registration with any of the parallel guide lines, the slot 32 and the parallel edges 30 forming the parts which determine the registration. A scale 34 is marked on the protractor and a cooperating marker or pointer 36 on the disc reads the angles through which the disc turns. The pointer may be adjustable as indicated by the arcuate slot 38.

Figure 3 shows one manner of conducting a vehicle wheel 40 to the top of the disc 12. A ramp or runway 42 gradually elevates the wheel until it is capable of running on the disc. The ramp is provided with an arcuate recess 44 in its surface for receiving the disc. The operative position of the ramp on the base plate is shown in dotted lines. After the wheel is supported on the disc the ramp can be moved as shown by the full lines. The top surface of the disc is preferably provided with lugs or scarifications 46 to insure against tire slippage.

The modification shown in Figures 4 and 5 differs from that shown in the preceding figures by a provision for adjustably securing the protractor to the edge of the disc. Instead of merely resting the ends of the protractor on the disc as in Figure 1, these ends are provided with shouldered studs 48 which extend through arcuate slots 50 formed in the margin of the disc. This provision couples the protractor to the disc while at the same time permitting circumferential adjustment with respect thereto.

In operation, a pair of such devices are positioned in alignment with the front steering wheels for receiving the same. The parallel guide lines 26 of each device are preferably arranged at right angles to the longitudinal axis of the vehicle to be tested. The protractor is adjusted about the edge of the disc until its arm 28 coincides or parallels the guide lines. The disc is turned until the pointer indicates zero on the protractor scale. When the front wheels are placed on the discs, they are turned or swung about causing the disc to rotate therewith. Due to the displacement of the wheels as previously explained the disc may slide or float in any direction over the surface of the base plate. This is indicated in Figure 3 where the disc is off center with respect to the base plate.

In the modification shown in Figure 1, the protractor may be removed during the turning motion. Upon repositioning the same along the edge of the disc and registering the arm with any one of the guide lines, the angle through which the disc and the wheel carried thereon can be measured. The lateral displacement of the disc will not affect the measurement. Irrespective of where the disc may roam on the base plate, the arm of the protractor can register with any one of the parallel guide lines. The arcuate slot 38 enables the pointer 36 to be adjusted in the event the disc rotates when the wheel is being placed thereon. When such occurs, the pointer may be adjusted by reason of the slot until the pointer again indicates zero on the scale.

In the modification shown in Figures 4 and 5, the protractor is carried along with the disc in its lateral or planetary displacement, but regardless of the position assumed on the surface of the base plate, the arm is able to register with a guide line in order that the protractor may be adjusted to zero register prior to the reading.

In the embodiment illustrated in Figures 6 and 7 the construction is similar in every respect to the modification shown in Figure 1 except that the annular bearing cage 18 is provided with a part coupled with the base 10 and the protractor 14 has a different engagement in the arcuate marginal slots of the disc 12. With more particular reference to these figures, the bearing cage 18 is provided with an extension or arm 51 having a longitudinal slot 52 therein. Protruding through this slot is a shouldered stud 54 fixed to the base and the connection between the stud and the arm is such that the bearing cage is permitted pivoted and slidable movement in any direction sufficient to follow the displacement of the disc. As in the previous figures, the split ring 22 couples the bearing cage to the disc. By this provision, the bearing cage forms an intermediary link coupling the disc to the base so that all the parts are joined into a unitary structure. The stud can be of such a type that it is able to tighten down upon the arm and hold the ball cage and the disc stationary upon the base.

Instead of providing studs 48 at the extremities of the protractor as shown in Figs. 4 and 5, the ends of the protractor may be turned over and into the slots as more clearly shown at 56 in Fig. 7.

In the embodiment illustrated in Figs. 8 through 12 inclusive, the base is provided with a recessed portion and a ramp or runway for conducting wheels to the top of the base. The wheel carrying disc is positioned over the depression and supported therein by a bearing support similar to that shown in Figs. 6 and 7. With more particular reference to Figures 8 to 12 inclusive, a base 60 has a surface slightly elevated above the floor and is provided with a runway or ramp 62 formed integrally therewith. The elevated portion is dished at 64 to form a circular recess. Over this recess is positioned a wheel carrying member or disc 66 supported by ball bearing 68 upon the floor of the recess.

The disc is of a size to overlap the margin of the recess.

The ball bearings 68 are retained in position by a ball cage 70 similar to that shown in Figs. 6 and 7. The ball cage is provided with a part or arm 72 clearly indicated in Fig. 10. This arm extends through a relatively wide slot 74 in the side of the circular recessed or depressed portion 64 and is provided with a relatively long slot 76 and a shorter slot 78. A shouldered stud 80 depends from the elevated part of the base through the slot 76 and secures the arm to the base while permitting limited freedom of movement in any direction. The arm 72 is shown as sliding over a bracket 82 riveted to the under surface of the base.

A plate 84 is secured to the disc in any desirable manner such as by threading the same on a depending element 86 on the bottom of the disc. The inner margin of the ball cage overlaps the outer margin of this plate as shown in Fig. 9. Both the cage and the plate are capable of lateral movement relative to one another. A ring 88 is carried freely about the threaded connection between the plate and disc, and radial springs 90 yieldingly center the ball cage with respect to the disc. The overlapping relationship of the ball cage 70 to the plate 84 secures the disc to the base while at the same time permitting the disc universal floating movement. The free play existing between the disc and the ball cage enables the latter to move at a speed independent of that of the disc thereby decreasing the amount of friction and increasing the sensitivity.

The margin of the disc 66 is notched at 90 and a locking dog 92 is shaped to fit into the notch. The dog is provided with a depending element or key 94 which fits into a rectangular slot in the base and extends through the slot 78 in the arm of the ball cage. It may also extend through a corresponding slot in the bracket 82. A chain 96 secures the dog to the base. When the dog is in the position shown in the drawings, the disc is locked in centered position against sliding movement when the wheel rolls upon the disc from the direction of the runway 62. When the dog has been removed from the notch 90 the disc may shift equally in any direction within the recess 64.

A protractor 98 and parallel etched lines 100, similar to that described in the previous drawings, may be used for measuring the rotation of the disc irrespective of its lateral displacement. The extremities 102 of the protractor are shown in this case as extending under the disc and up through the arcuate slots 104. In this manner they are connected to the disc against removal but are permitted adjustment relative thereto.

The operation of the embodiment last described is substantially similar to that of the two earlier embodiments. Instead, however, of providing a removable runway or ramp for conducting the wheel to the top of the disc, the ramp forms an integral part of the base. As the wheel is conducted up the ramp and upon the disc, the locking dog 92 retains the disc in centered position. When the wheel has been positioned upon the disc, the brakes are set and the dog removed. Swiveling the wheel causes the disc to both rotate and shift. Due to the play allowed the ball retaining plate 70, the ball bearings 68 roll upon the base at reduced or half speed to that of the disc thereby providing the disc a greater ease of movement. The radial springs 90 center the ball cage with respect to the disc when the wheel has been removed. The extension of the locking dog through the arm 72 rigidifies both the disc and the ball cage into an immovable unit. The wide slot 74 in the side of the recess permits considerable latitude in the pivotal movement of the ball cage about the stud 80. The reading of the scale is like that described in connection with the first embodiment.

We claim:

1. A gauge for determining the angles through which steering wheels of vehicles are turned comprising, in combination, a base plate having one margin of the surface thereof etched with a plurality of parallel guide lines, a wheel supporting disc carried upon the surface of said base plate by bearings, said bearings supporting said disc to move about freely over the surface of the base plate and to rotate with respect thereto, an arcuate member fitting the marginal edge of said disc and adapted to bridge the distance between the disc and the etched portion of the base plate, said arcuate member provided with a scale for measuring the rotation of said disc and provided with means for aligning the same parallel with the said guide lines.

2. A radius turning gauge comprising, in combination, a base plate having a plurality of parallel guide lines indicated thereon, a wheel supporting disc removably supported on said base plate by means of bearings for bodily displacement over the surface of the base and for rotation in accordance with the wheel, and a member having an arcuate scaled portion adapted to be disposed adjacent to the edge of said disc for measuring the angle of rotation of the disc and provided with a part adapted to align the member with said parallel guide lines.

3. A radius turning gauge for measuring angles through which a vehicle wheel is turned comprising, in combination, a base, a wheel supporting member both freely movable and rotatable upon the surface of said base, reference means on said base, and an angle measuring device carried by said member and adjustable circumferentially with respect thereto, said device having means cooperating with said reference means for indicating the angle of rotation of said member irrespective of the position to which the member moves upon the base.

4. A wheel measuring device of the character described comprising, in combination, a base plate having a plurality of parallel lines extending along one margin thereof, a wheel supporting disc freely rotatable and slidable upon said base plate, and angle measuring means carried about the circumference of said disc and being circumferentially adjustable with respect thereto, said means having a lateral extending member provided with a slot adapted to overlie any one of said lines and provide a reference for measuring the angle subtended by the rotation of said disc irrespective of the position assumed by the disc on said base plate.

5. A wheel measuring device of the class described comprising, in combination, a base plate having a plurality of reference lines extending parallel to one another, a wheel supporting disc supported upon bearings for rotatable and slidable movement over the surface of said base plate and provided with an arcuate slot, said disc provided with an arcuate protractor adjustably supported upon the edge of the disc by means of a stud extending through said slot, said protractor provided with a part adapted to register with said etched lines to provide a zero reference from which the angle of rotation of said disc can be measured irrespective of the position to which it may shift upon said base plate.

6. A radius turning gauge of the character described comprising, in combination, a base, a wheel carrying element, means supporting said element for rotatable and slidable movement upon the base, said means coupled with said element and provided with an extension coupled with said base to associate said parts into a unitary structure while permitting rotatable and slidable movement of said element, reference means on said base, and angle measuring means adjustably shiftable about the margin of said element and provided with a part adapted to register with said reference means irrespective of the position to which said element shall slide.

7. A wheel measuring gauge comprising, in combination, a base having an elevated platform and a slanting portion upon which vehicle wheels may be conducted to the elevated platform, said base provided with a circular depression in the elevated portion, a wheel carrying disc positioned over said depression and being of a size to overlap upon the margin of the platform surrounding the depression, an annular bearing cage in said depression provided with bearings rotatably and slidably supporting said disc upon the bottom of said depression, said cage provided with a part extending through a slot in the side wall of said depression and coupled with said base for limited free movement in any direction, said platform provided with parallel reference indications, a protractor secured to the margin of said disc for circumferential adjustment with respect thereto and provided with a part adapted to register with any of said reference indications irrespective of the position to which said disc may slide relative to the platform, and removable locking means for engaging said disc and holding the same centered above the recess as a wheel is conducted thereupon for testing purposes.

8. A radius turning gauge comprising, in combination, a base having a plurality of parallel guide lines formed on its upper surface, a rotatable wheel carrying disc supported upon said base for bodily shiftable movement thereover and for rotation with respect thereto, a protractor shiftable over the base and coupled with said disc to shift with the bodily shifting of the disc over the base, said protractor having an arcuate margin shaped to conform to the curvature of the disc, said protractor having guide means for aligning the same with the parallel lines on the surface of the base and provided on its arcuate margin with indicating means adapted to measure the extent of rotation of the disc.

9. A radius turning gauge for measuring the angle through which a vehicle wheel is turned comprising, in combination, a base, a wheel supporting element mounted on the base for bodily floating movement thereover and for rotation, an angle measuring device shiftable over the base and coupled with the wheel supporting element to shift therewith over the base, said angle measuring device having means adapted to cooperate with indicating means on the base to position said device with respect to the base, said base provided with indicating means adapted to cooperate with said means of the angle measuring device to position said device with particular reference to the base at any one of a multiplicity of positions to which said device may be shifted in conformity with the shiftable movement of the wheel supporting element.

10. A radius turning gauge for measuring the angle through which a vehicle wheel is turned comprising, in combination, a base, a wheel supporting element mounted upon the base for bodily floating movement thereover and for rotation, said base and said wheel supporting element each provided with indicating means, an angle measuring device coupled with the wheel supporting element and shiftable therewith over the base and provided with indicating means adapted to cooperate with the indicating means on the base and with indicating means adapted to cooperate with the indicating means on the wheel supporting element to measure the rotation of the wheel supporting element with respect to the base at any position to which such element may be shifted with respect to the base.

11. A radius turning gauge for measuring the angle through which a vehicle wheel is turned comprising, in combination, a base, a wheel supporting element mounted upon the base for floating movement thereover and for rotation, said base provided with a plurality of positioning marks, said wheel supporting element provided with rotation indicating means, an angle measuring device supported upon the base for shiftable movement thereover and adapted to bridge the space between the wheel supporting element and the positioning indicating marks on the base at any position to which the wheel supporting element is shifted, and provided with position indicating means adapted to cooperate with the positioning marks on the base to position said device with respect to the base, said device also provided with rotation indicating means adapted to cooperate with the rotation indicating means on the wheel supporting element to measure the rotation thereof with respect to the base in any position to which such wheel supporting element has been shifted.

12. The invention defined in claim 11 characterized in that at least one of said rotation indicating means is adjustable with respect to the element carrying the same.

13. A radius turning gauge for measuring the angle through which a vehicle wheel is turned comprising, in combination, a base, a wheel supporting disc connected with and mounted upon the base for floating movement thereover and for rotation, said base provided with position indicating means, said wheel supporting disc provided with rotation indicating means, an angle measuring device supported upon the base for shiftable movement over the base and coupled with the wheel supporting disc for shiftable movement therewith, said device adapted at any position of the wheel supporting element to be disposed between the rotation indicating means on the element and the position indicating means on the base to measure the rotation of the element with respect to the base.

14. A radius turning gauge for measuring the angle through which a vehicle wheel is turned comprising, in combination, a base, a wheel supporting element, bearing means connected with the wheel supporting element and interposed between the base and said element supporting the element for rotation and for free floating movement over the base, said bearing means provided with a slotted extension, said base having a part extending through said slot connecting the bearing means with the base for free floating movement thereover, said base provided with a plurality of positioning marks, said element provided with a rotation indicator, and an angle measuring device shiftable over the base and provided with position indicating means adapted to be brought into registration with the position indicating means for the base at any shiftable position, and provided with rotation indicating means adapted to indicate in cooperation with the rotation indicating means on the wheel supporting element the rotation of said element at any shifted position.

15. The invention as defined in claim 11 characterized in that said angle measuring device is coupled with the wheel supporting element for shiftable movement therewith and is provided with an arcuate portion embracing a portion of the circumference of the wheel supporting element and carrying said rotation indicating means, said wheel supporting element having an arm projecting radially therefrom and coupled with the base.

16. A radius turning gauge for measuring the angle through which a vehicle wheel is turned comprising, in combination, a base, a wheel supporting disc connected with and mounted upon the base for floating movement thereover and for rotation, said base provided with position indicating means, said wheel supporting disc provided with rotation indicating means, an angle measuring device supported upon the base for shiftable movement over the base and coupled with the wheel supporting disc for shiftable movement therewith, said device having an arcuate portion embracing a portion of the circumference of the wheel supporting disc and adapted at any position of the disc to be disposed between the rotation indicating means on the disc and the position indicating means on the base to measure the rotation of the disc with respect to the base, and an arm projecting radially from said arcuate portion and having a slot forming a guide adapted for alignment with the position indicating means on the base.

GEORGE M. GRAHAM.
ARTHUR E. PRICE.